Figure 5:
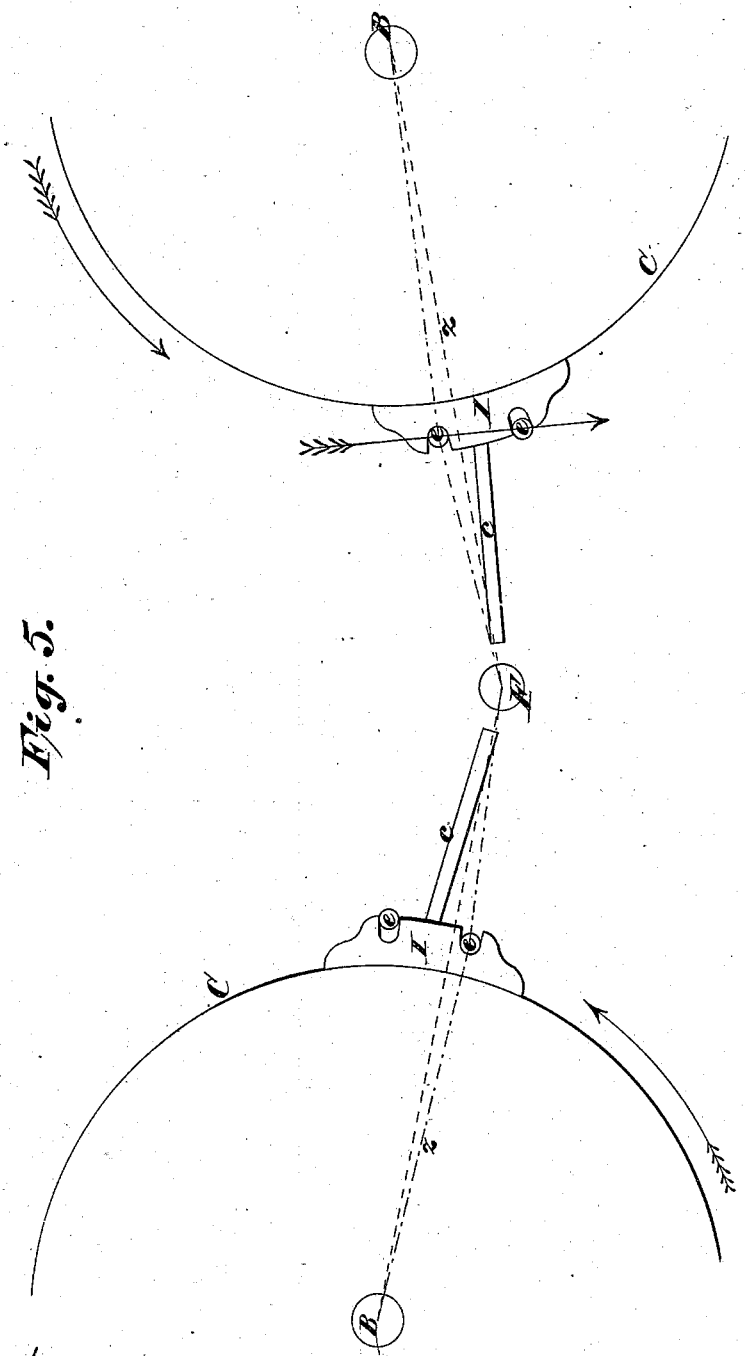

(No Model.)  8 Sheets—Sheet 1.
W. D. EWART.
Car Brake.
No. 240,680.  Patented April 26, 1881.
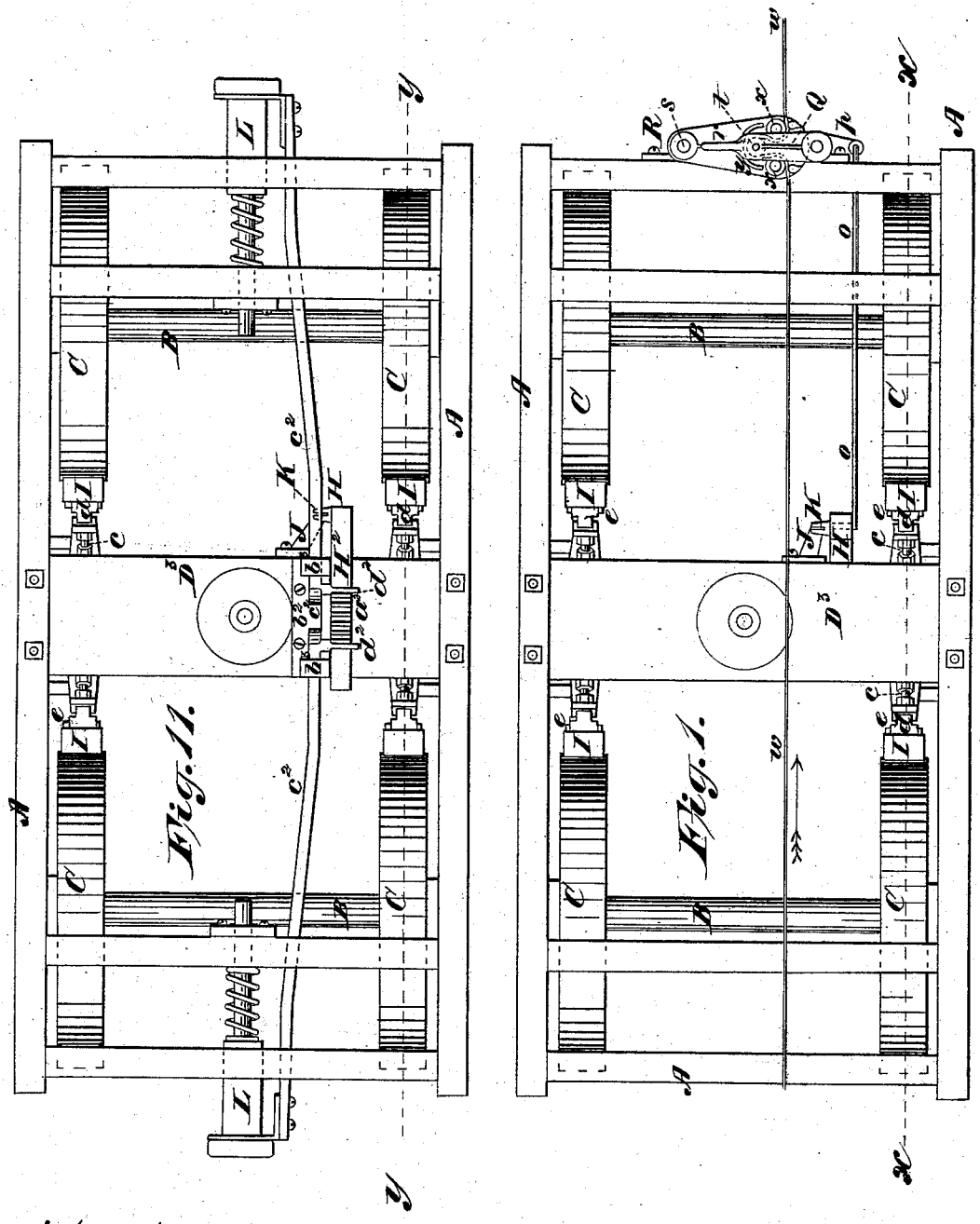
WITNESSES.
H. F. Parker
Jacob Felbel
INVENTOR.
W. D. Ewart
By atty.
J. N. McIntire (No Model.)  W. D. EWART.  8 Sheets—Sheet 2.
Car Brake.
No. 240,680.  Patented April 26, 1881.
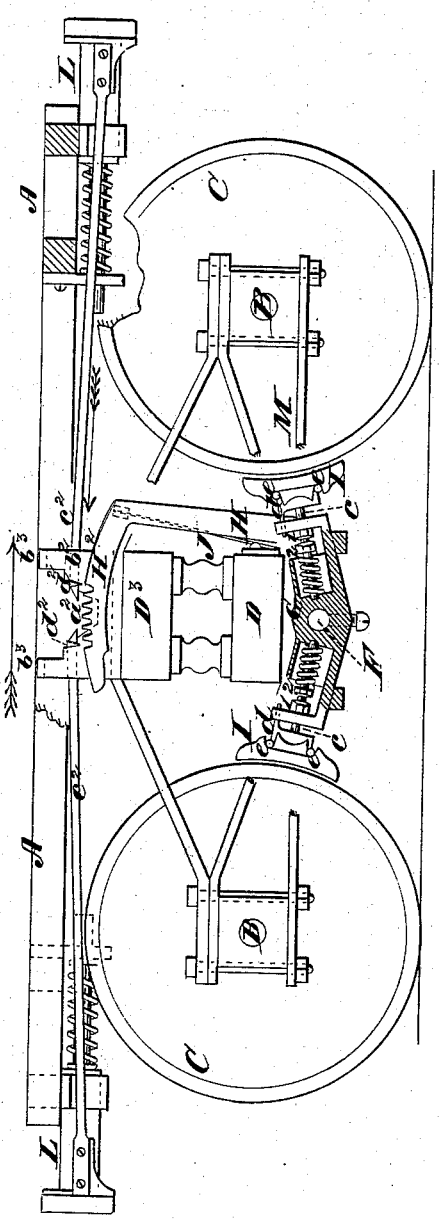
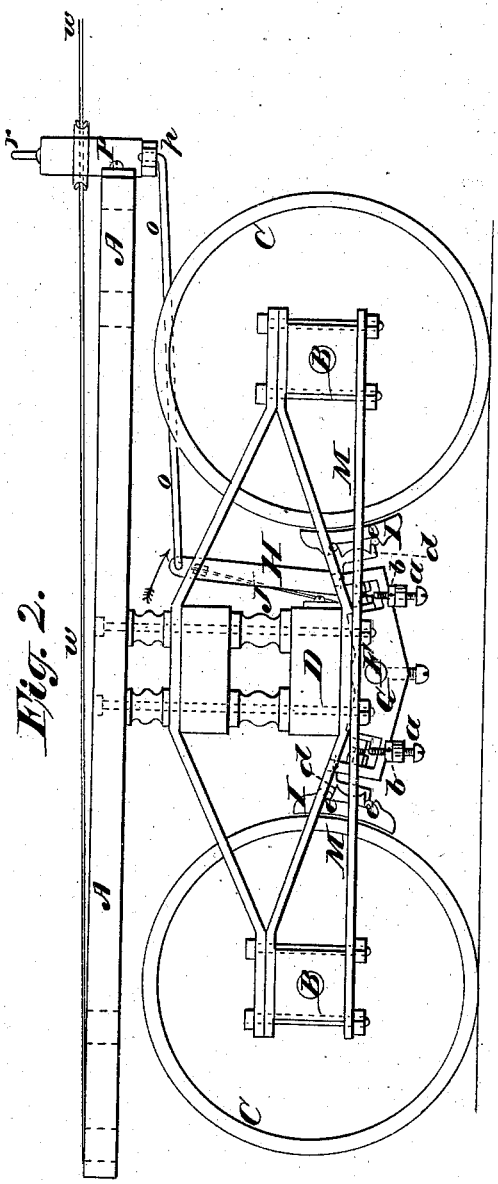
WITNESSES.
H. H. Parker.
Jacob Felbel.
INVENTOR.
W. D. Ewart
By atty.
J. N. McIntire (No Model.)　　　　　W. D. EWART.　　　8 Sheets—Sheet 3.
Car Brake.
No. 240,680.　　　　　　Patented April 26, 1881.
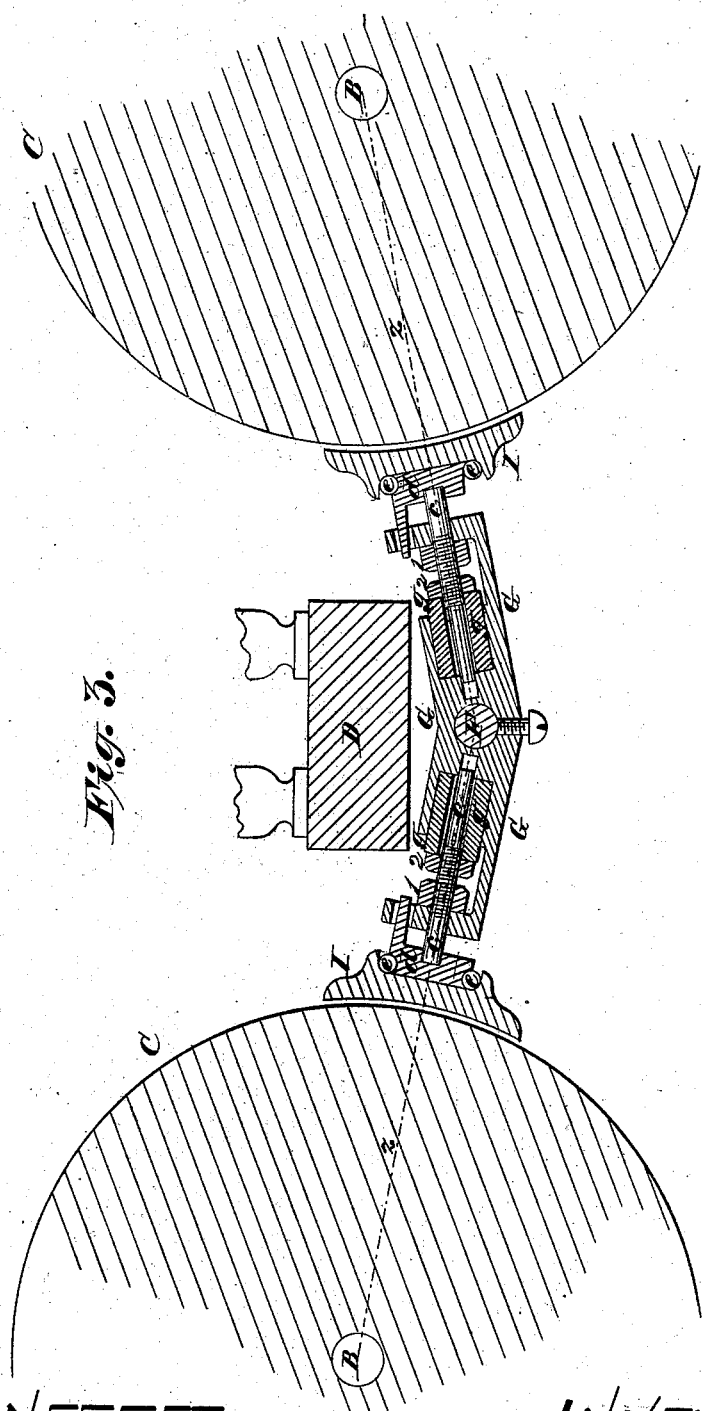

(No Model.) W. D. EWART. Car Brake.
No. 240,680. Patented April 26, 1881.
8 Sheets—Sheet 4.
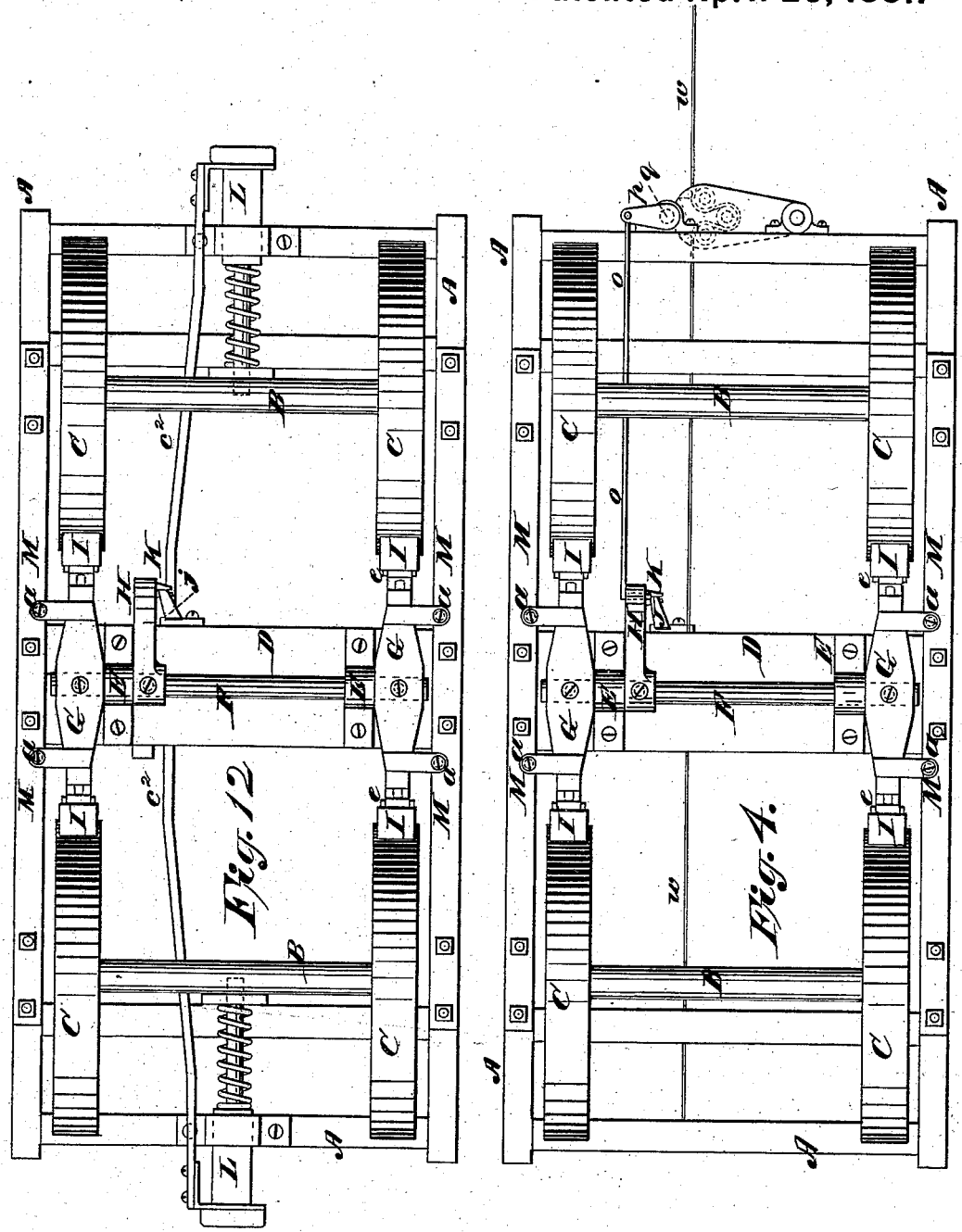
WITNESSES.
H. A. Parker.
Jacob Felbel
INVENTOR.
W. D. Ewart
By atty
J. N. McIntire (No Model.) 8 Sheets—Sheet 5.

W. D. EWART.
Car Brake.

No. 240,680. Patented April 26, 1881.

WITNESSES
H. F. Parker.
Jacob Felbel

INVENTOR.
W. D. Ewart
By atty
J. N. McIntire

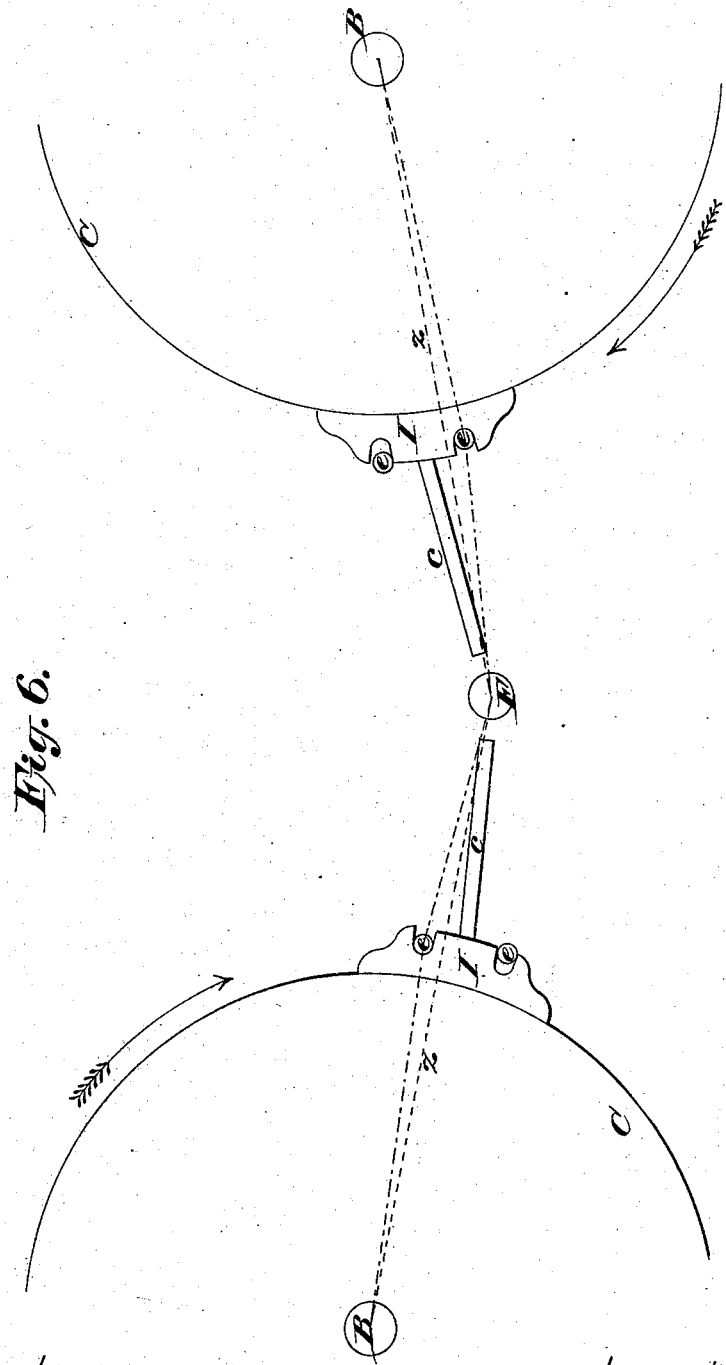

(No Model.)
W. D. EWART.
Car Brake.
No. 240,680.   Patented April 26, 1881.
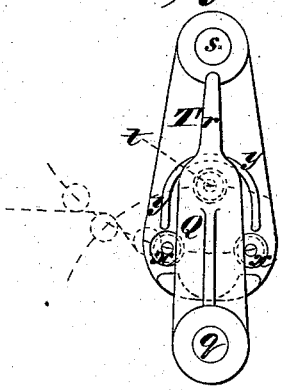 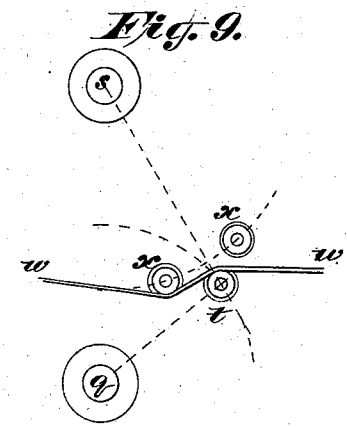 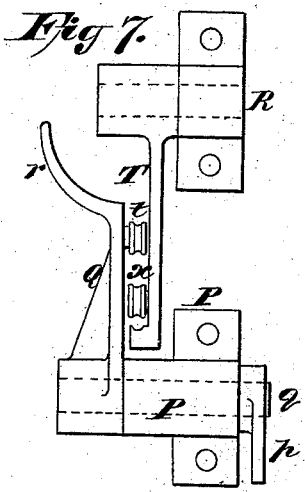
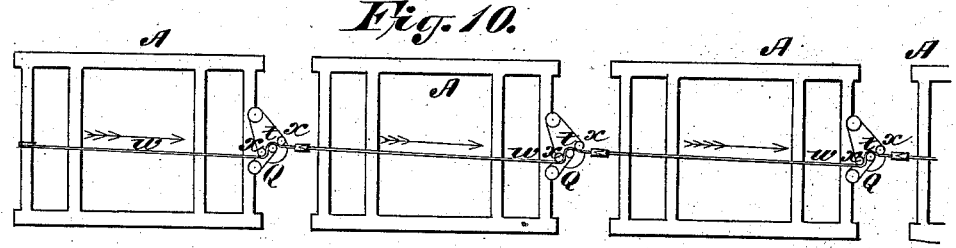
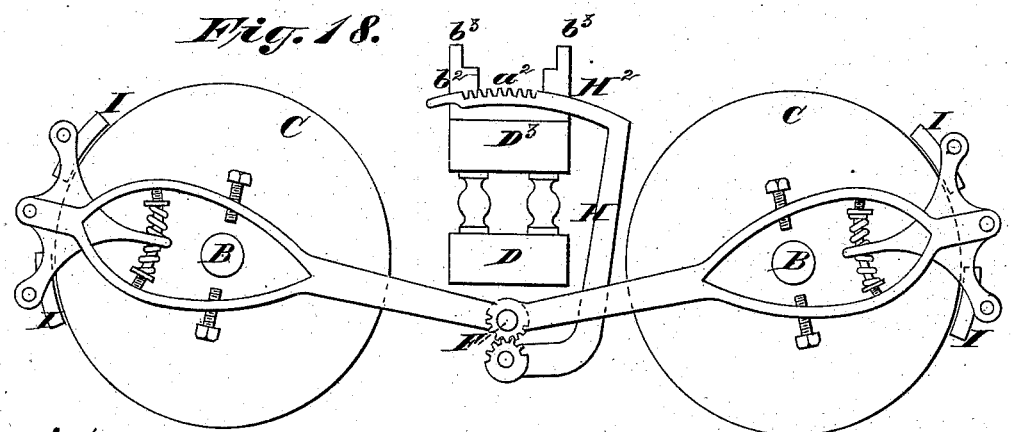
WITNESSES
H. A. Parker.
Jacob Felbel
INVENTOR.
W. D. Ewart
By atty (No Model.)

W. D. EWART.
Car Brake.

No. 240,680. Patented April 26, 1881.

8 Sheets—Sheet 8.

WITNESSES
H. F. Parker.
Jacob Felbel

INVENTOR.
W. D. Ewart
By atty.
J. N. McIntire

UNITED STATES PATENT OFFICE.

WILLIAM D. EWART, OF CHICAGO, ILLINOIS.

CAR-BRAKE.

SPECIFICATION forming part of Letters Patent No. 240,680, dated April 26, 1881.

Application filed May 5, 1880. (No model.)

*To all whom it may concern:*

Be it known that I, WILLIAM DANA EWART, of Chicago, in the county of Cook and State of Illinois, have invented certain new and useful Improvements in Car-Brakes; and I do hereby declare that the following is a full and exact description thereof, reference being had to the accompanying drawings, making part of this application.

Previous to my invention a great variety of mechanisms or organisms have been devised having for their object to effect the application to the treads of the wheels of the brakes or brake-shoes of railroad-carriages of all descriptions, and among the numerous methods of and means for effecting this object have been organisms in which the application of the brakes was effected automatically, (*i. e.*, solely by the movements and action of the carriages of the train, either usual or accidental, or both,) other organisms in which the application of the brakes was effected wholly by the engineer or others in charge of the train, and others still in which the application of the brakes was effected, under certain circumstances, by the person or persons in charge of the train, and under certain other circumstances—as, for instance, in the case of a severance in the train—automatically, while in all the various modes and mechanisms the motive power used in the application of the brakes has been derived in some cases from some sort of motor separate from and independent of the motive power of the train, in other cases from the engine or driver of the train, and in still other cases it has been suggested to employ the rotative force of the wheels of the car by their frictional action upon the brake-shoes to operate the brake mechanism; but in no case that I know of has an organized car-brake mechanism been devised designed to work on this last-mentioned principle which has been capable of effecting a proper kind of retardation of the wheels and an eventual stoppage of the train, and at the same time capable of a ready release-ment of the brakes and not liable to cause the wheels to slide on the track.

I have devised a practically successful means whereby this desirable principle of operation—*i. e.*, the actuation of the brakes by the rotative action on them of the wheels—may be utilized; and in the accomplishment of this desirable end lies the main object of my invention, which latter consists, primarily, in the employment, in combination with the wheels of a railroad-carriage, of brakes adapted to be presented, when required, in slight contact with the wheels, and so arranged and operating by this frictional contact that the turning of the wheels will draw or force the brakes into a closer but yielding contact with the wheels, and thus stop their rotation and "brake" the car, all as will be hereinafter more fully explained. This mode of operation and principle of construction in a railroad-car brake mechanism may, of course, be carried out in a variety of constructions, differing in the details, and necessitate, of course, the presence in the general organism of some means (either automatic or otherwise) for effecting at the proper and desired times the adjustment of the parts or some of them to that condition of slight contact with the wheels which will permit and insure the bringing of the brake-shoes, by the action of said wheel, into the described more forcible contact with the latter, for the purpose alluded to, and though this adjustment of the parts may be produced either automatically (according to the conditions and actions of the cars of the train) or at the will and through the influence of the engineer or other attendant or attendants of the train, yet I deem it more or less important to the practical success of the main feature of my invention that certain means be employed in connection therewith to effect, in a certain manner, this adjustment to a working condition of the brake mechanism; and my invention consists, secondarily, in certain novel means for the accomplishment of this purpose, which means will be hereinafter more fully described.

In order that those skilled in the art may more fully understand the nature or the several features of my invention and may be thoroughly instructed how to make and use the same, I will now proceed to more fully describe it in connection with the accompanying drawings, in which I have shown, in various figures or views, a car-truck having applied to it my improved brake, and have illustrated the various features of my said invention as I have contemplated and experimentally tested their reduction to a practical form.

In the said drawings, which form part of this specification, Figure 1 is a top view of the truck and portion of the frame of a car having applied thereto my improved brake mechanism with one form of what I designate the "setting mechanism." Fig. 2 is a side view of the same. Fig. 3 is a partial section (enlarged scale) at the line $x$ $x$ of Fig. 1. Fig. 4 is a bottom view. Fig. 5 is a skeleton sectional view, (enlarged scale,) showing the brakes set for one direction of the movement of the car. Fig. 6 is a similar view, but showing the brakes set in an opposite direction. Figs. 7, 8, and 9 are detail views (enlarged scale) of the contrivance for moving the brake-setting rod, and which is operated by the brake-cord. Fig. 10 is a view (reduced scale) illustrating an arrangement of a series of cars the brakes of which are operated by one cord under the control of the engineer. Fig. 11 is a top view of a truck having applied thereto my improved brake, but showing another means of setting the brake for use through the medium of the buffer-bars of the cars acting automatically. Fig. 12 is a bottom view of the same. Fig. 13 is a vertical section of the same at the line $y$ $y$, Fig. 11. Figs. 14, 15, 16, and 17 are skeleton views, showing the parts in various positions and illustrating the operation of the adjusting mechanism. Fig. 18 is a skeleton view, showing a modified arrangement of the brake-shoes with the wheels.

In the several figures, wherever the same letters appear, it will be found that they denote the same part of the contrivance.

A is a portion of the frame of an ordinary four-wheeled car-truck, provided with the usual axles, B, and wheels C.

To the under side of the lower cross-beam, D, of the truck are securely bolted boxes E E, in which is arranged a rock-shaft, F, upon which, near either end, are securely fastened the brake-carrying frames G G, and which has also securely fastened to it (at another point) the lower end of an arm or lever, H, by which the said rock-shaft may be partially rotated (in its bearings in the boxes or stands E E) in either direction, for purposes to be presently explained.

I are the brake-shoes, which bear upon the treads or rail-bearing portions of the peripheries of the wheels C, and these shoes are hung in the brake-carrying frames G in a peculiar manner, to be presently described.

J is a strong bar-spring, the lower end or root of which is secured, in any suitable manner, to one side of the cross-beam D of the truck, and the upper end of which passes through a slot or slit in a laterally-projecting lug, K, of the arm or lever H, so that said spring can operate (by its tendency to assume its normal condition whenever it may have been sprung in either direction) to bring to and retain in a given position the upper end of the vibratory arm or lever H, for purposes to be presently explained.

L L are the usual buffer-bars or bumpers, (for convenience illustrated as occurring at each end of the truck,) in connection with which, in one modification of my brake mechanism, I apply a means for adjusting the brake frames and shoes in position to operate.

As the frames which carry the brake-shoes are duplicates, a description of one will suffice for both, and as the means for adjusting the brake-frames through the medium of the rock-shaft F and its arm or lever H are in a measure separate from the brakes proper, and may be of one or another character without affecting the principle of construction of the brakes proper, I will describe the latter as common to both modifications of the two entire organisms shown in the drawings.

The frame G is keyed to or otherwise made fast on the rock-shaft F, and is formed or provided with laterally-projecting lugs or portions, in which are arranged set-screws $a$ $a$, provided with jam-nuts $b$ $b$, said screws operating as adjustable stops, and being arranged, as shown, near either end of said frame G, and so as to come into contact with the under side of the frame-bar M, they act to control the extent of vibration or movement of said frame about its axis of motion, which is the axis of shaft F.

In either end of the frame G is arranged a sliding shaft or stud, $c$, and each of said studs $c$ carries at its outer or projecting end a head-piece or bearer, $d$, having two parallel pintles or arbors, $e$ $e$, upon one or the other of which the brake-shoe I takes a pivotal bearing or has its fulcrum, according to the direction in which the brake-shoes work, as will be presently explained. The body portion and inner (or adjacent) end of each stud $c$ is surrounded during part of its length by either a rubber spring-block, $g$, as seen at Fig. 3, or by a spiral spring, as seen at Fig. 13, contained in the housing of frame G, and said stud is provided, as shown, with two nuts, (its body being threaded for their accommodation,) one of which, 1, serves as a stop to control the extent to which said stud can move outward (and endwise) in its housing in frame G, and the other of which, 2, operates to bear upon the confined rubber (or other) spring $g$. (See Fig. 3.)

The brake-shoe I, as represented, is recessed out centrally on its back side and in the direction of its length for the accommodation of the bearing head-piece $d$ of the stud $c$, and has also two semi-cylindrical concavities running crosswise, for the accommodation of the two pintles or fulcra-arbors $e$ $e$, before referred to, and on one or the other of which the brake-shoe I turns and bears when operating to brake the wheels of the car.

From what has so far been said of the construction and arrangement of the parts of the brake proper, together with an observation of the drawings, the operation of the brake will be understood to be as follows, viz: When in a state of inaction—as shown at Figs. 2 and 3, for instance—none of the brake-shoes I are in contact with the peripheries of the wheels. The latter run clear of the brakes, (as usual in other brake mechanisms,) and the brakes are retained in this position by the strong spring-bar J, the normal position of the upper end of which is such as to hold the upper end of the bent arm or lever H in that position in which said lever will hold the rock-shaft F properly to insure such a position of the frames G as to maintain the said position of the said brake-shoes. Whenever it is necessary or desirable to have the brakes applied the upper end of lever H is vibrated in one direction or the other, (according to the direction in which the car may be moving,) and the frames G thus turned or oscillated about the axis of motion of shaft F to an extent sufficient to throw the brake-shoes I into coaction with the peripheries of the wheels C, when, by reason of such coaction, the moving peripheries of the wheels will operate upon the brake-shoes to draw them still farther around, thus increasing the friction on the wheel-faces and effecting the proper retardation of the wheels to cause the stoppage of the car.

To explain this operation of the application of the brakes more minutely and fully, I will refer particularly to Figs. 5 and 6, which I have made for the particular purpose of illustrating this part of the operation of the apparatus shown in the drawings.

Referring to Fig. 5, it will be seen that, with the car moving in a direction which would cause the wheels C to rotate in the directions indicated by the arrows in said figure, the application of the brakes must be effected by moving the upper end of arm H in the direction indicated by its arrow, and so that the frame G will be turned (by the shaft F) into the position shown, in which the brake-shoe I at the right-hand side of Fig. 5 is moved downward against the periphery of its wheel, and so as to turn upon and be supported in its thrust against the wheel by the upper one of its two pintle-like fulcra $e$, while the brake-shoe I at the left of Fig. 5 is moved upward against its wheel, and turns upon and is supported in its thrust against the wheel by the lowermost one of its two arbor-like fulcra $e$, these fulcra and sustaining-pintles $e$, in the cases of both brake-shoes, constituting the enforcing support furnished to the shoes by the head-pieces $d$ of the short shafts or studs $c$. It will, of course, be understood that when brought to this position the movement of the wheels tends to make all the movable parts of the brake move still farther in the described directions, and that in their movements thus the fulcral or pivotal point of support of each brake-shoe is brought nearer to an imaginary right line, such as represented by the dotted line $z\,z$, which intersects both the axis of the wheel (to which such brake is being applied) and the axis of shaft F, and that in proportion as these pivotal points approach said lines does the degree of pressure of the brake-shoes on the wheels increase in a very rapid ratio.

As the frames G, which carry the shoes I, and the wheels C respectively oscillate and rotate about fixed axes of motion, more or less movement endwise of the studs $c$ must of course occur during the just-described action of the parts, and this is permitted and effected by reason of the said studs being free to slide endwise in their bearings in said frames G, and by reason of the strong rubber or other springs, arranged as shown, the adjustable stop-nuts 1 and 2 operating respectively to limit the outward sliding movement of said studs, and regulate the compression and reactive force of the springs that tend to throw said studs outward. The extent of oscillation of the frames G, however, must be controlled, as otherwise the wheel might so conjointly operate with the brake-shoe as to cause the latter to be brought into a position in which the pivotal point at $e$ would come quite into the right line before referred to, in which case the moving parts would get, so to speak, on a dead-center, and so tightly wedged together as to render the releasement of the brake difficult or impracticable. To effect this control of the frame G for the purpose of controlling the action of the brakes, the set-screw stops $a$ before mentioned are used, and by the proper adjustment of said screws (according to the condition and wear of the parts during continued use) the contrivance is kept in a condition of adjustment such that when turned in either direction the frames G will be stopped from moving too far by the end of one or the other of screws $a$ coming into contact with the rigid bar of the truck-frame. Supposing the car to have stopped the instant the wheels cease to rotate, and their tendency is no longer to draw the brake-shoes (by frictional contact) into the position just explained, the spring J, exerting its influence upon the arm H and assisted in the initial movement by the natural reactive movement of the wheels in the stoppage of the direction of movement of the car, effects the necessary turning of the shaft F to bring all parts back to a position of inaction.

During the continued use of the apparatus, and according to circumstances, the nuts 1 and 2 and other adjustable parts may be varied and set to compensate for the wear of parts, and as the observation of the engineer may indicate such adjustments to be necessary.

By reason of the capacity of the studs $d$ to move endwise, and by the combination therewith of the springs, as described, the brake-shoes operate with a yielding or slightly-elastic pressure, which is important both to compensate for any irregularities of surface in the periphery of the wheel and to assist the automatic releasement of the shoe and wheel surfaces from forcible contact with each other.

At Fig. 6 the positions of the parts are such as they would be moved into by moving the arm H in a direction opposite to that just explained of Fig. 5, and for the purpose of braking the car when it should be moving in the other direction, and of course the releasement of the brakes would be effected in the same manner as described of Fig. 5, except that in centering the arm H the action of the spring J would occur in an opposite direction.

For the purpose of operating the vibratory arm H in the manner just described, and at the proper times to adjust the brake mechanism to that condition in which the wheels themselves will affect the action of the brake-shoes, I have shown two sets of devices or two different means—one designed to be managed by the engineer or other attendant of the train, (as before remarked,) the other designed to be wholly automatic and operated by the cars of the train. The first-mentioned means will be found illustrated at Figs. 1, 2, 4, 7, 8, 9, and 10, and the other in Figs. 11 to 18, inclusive, and I will now describe them in the order just mentioned.

To the arm or lever H, near its upper end, is connected one end of a rod, o, the other end of which is connected to a crank, p, on the lower end of a vertical shaft, q, which is arranged to turn freely in a metallic stand, P, bolted or otherwise secured to one end of the truck-frame. It is obvious that in box-cars this shaft would extend up the end and the mechanism be on top of them.

On the upper end of the shaft q is keyed fast a lever, Q, which, by preference, is formed with a handle at r, and on the lower end of which is mounted a small sheave or grooved pulley, t. At the same end of the truck-frame, and a short distance from the stand P, is secured another and somewhat similar stand, R, in which is arranged (to turn freely) a shaft or spindle, s, to the upper end of which is made fast one end of an arm or plate, T, on the upper surface of which are mounted two small pulleys or sheaves, x x, similar to the one t, and the arrangement of the vibratory arms or levers Q and T is such that they may move one immediately over the other in parallel planes, (Q being uppermost,) the pulleys t and x x lying in the same horizontal plane. The relative arrangement of these small pulleys will be best understood by reference to the drawings, (see Figs. 1, 7, 8, and 9,) and is such that when the cord w is passed round about them (in the manner shown) said cord may be made, by a pull upon it, to slightly vibrate the two arms Q and T, in a manner to be presently explained. The lower arm, T, has formed on its upper surface a sort of V-shaped upwardly-projecting rib or feather, y, at each extremity of which is located one of the pulleys x x, as shown, and against which works the pulley t of the arm Q. The cord w has one of its ends secured (at any convenient point) to the rear portion of the hindmost car of the train, and said cord passes thence partially round one of the pulleys x, thence partially around pulley t, thence partially around the other of pulleys x, forming a sort of loop, as shown, and thence around or through the looping-pulleys of all the cars to the engine, or to where the engineer or other attendant can manage it.

A careful observation of the drawings will show that if the cord w be pulled slightly in the direction of the arrow (at Figs. 1, 9, and 10) the effect will be to turn the lever Q from its normal position to that shown at Fig. 10; and it will be understood that such movement of the parts will rotate the shaft q sufficiently to turn the crank p and pull-rod o in the proper direction and to the proper extent to vibrate the arm H of the brake mechanism, in the manner I have previously explained, and set the brake-shoes to come into contact with the peripheries of the car-wheels, (assuming, of course, that the car is traveling in the direction indicated by the arrow at Fig. 1.) The brakes having been set, the cord is released or left free, and when the automatic releasement of the brakes occurs (in the manner already explained) the arms Q and T, cord w, and other devices resume their original positions, ready for reuse.

It will, of course, be understood that in backing the train the cord must be worked from the opposite direction, and that the train may be slightly retarded during its forward motion by thus pulling the cord in a reversed direction.

It will be seen that with such a setting mechanism any and all slack in the cord w will first be taken up by the initial pull on the cord, and that thereafter, by a continued pull on the cord, the brakes will be successively applied, and that in a train of cars the pull-cord for the whole train may be made of separate cords to each car, coupled together, (after the fashion of uniting the bell-cord of cars,) and that so long as each cord is amply long for each car any extra length will be taken up as slack in the length of the train. Of course, if, after having drawn the cord taut enough to take out the slack of all the loops, it be further pulled or taken up to only a part of the extent to which it is possible to take it up, only a part of the brakes of the whole train will be set, and sometimes it may be possible to so only partially brake the train. Fig. 10 illustrates this arrangement of the cords of several cars, and I propose, if found expedient, to have the forward end of the brake-cord attached to a reel or some convenient device at the engine, (or wherever the cord is to be pulled from,) so that the engineer or attendant can conveniently and rapidly take up and let out the rope, as occasion requires.

One great advantage, it will be understood, of such an arrangement of brake-setting mechanism as I have just described is that in the operation of setting the brakes those of the hindmost car of a train would be set first, and then the next forward car, and so on toward the engine, which is more desirable in many instances than permitting the inertia of the rearward cars to cause a jamming together of the cars, or to partially overcome the train-stopping tendency of slacking up the engine. As in any brake mechanism in which the brakes are applied by means of a train-cord, any parting of the cars of the train will necessarily pull the cord and set the brakes. In the automatic brake-setting mechanism shown this order of setting the brakes of the successive cars would be reversed, as I will now explain.

In the automatic contrivance I have the arm H made or provided with a curved portion, as seen at $H^2$, (see Figs. 11, 13, 14, 15, 16, 17, 18,) which is toothed on the top at $a^2$ to form a sector the center of which is coincident with the axis of motion of shaft F. At one side of this sector-like portion $H^2$ of the rocking lever H is arranged a double stand, $b^2$, made, as shown, with two loop-like parts, $b^3$, which serve as guides to two rods, $c^2$, the said stand being securely fastened to the upper surface of one of the cross-beams $D^3$ of the truck-frame. The bars or rods $c^2$ are attached, as shown, at their more distant ends to the buffer-bars of the truck, while at their adjacent ends they pass through and are held and guided laterally in the said loop-like parts $b^3$ of the stand $b^2$. At the adjacent ends each of said bars $c^2$ is beveled off from its top downward to the end, and has near its end a laterally-projecting lug or short stud, $d^2$, the lower edge of which is knife-like or thinned down to adapt said stud to drop down into any one of the spaces between the teeth of the sector $a^2$, into which it may be permitted to descend, and the conformation of that portion of stand $b^2$ on which each of the adjacent ends of the bars $c^2$ rests is such as to act as a surface-cam to permit the descent of the stud $d^2$, and to elevate it as the end of the rod carrying such stud may be moved back and forth (endwise of the rod) over said cam-surface.

Figure 14:
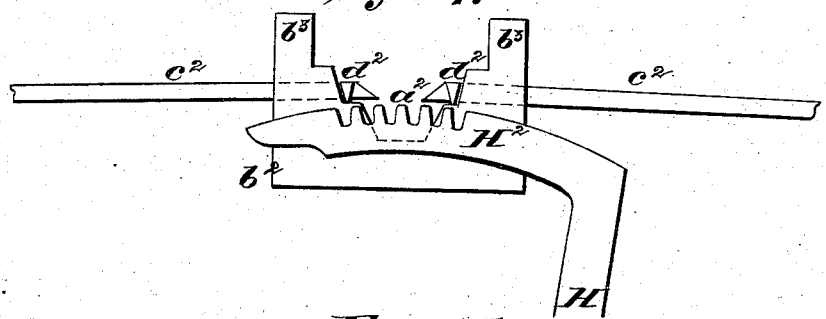
Figure 15:
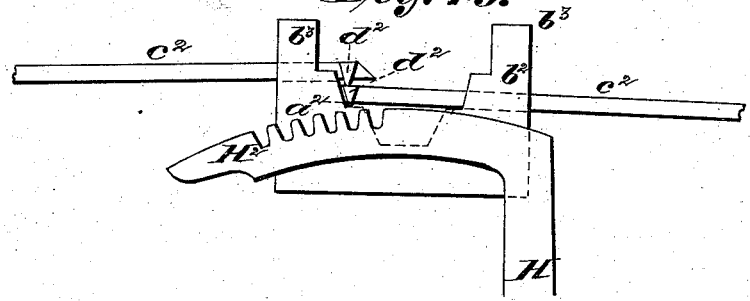
Figure 16:
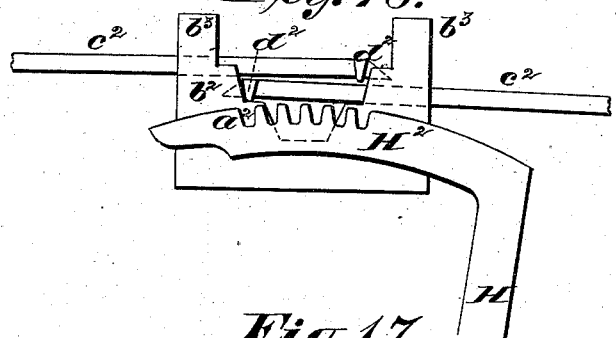
Figure 17:
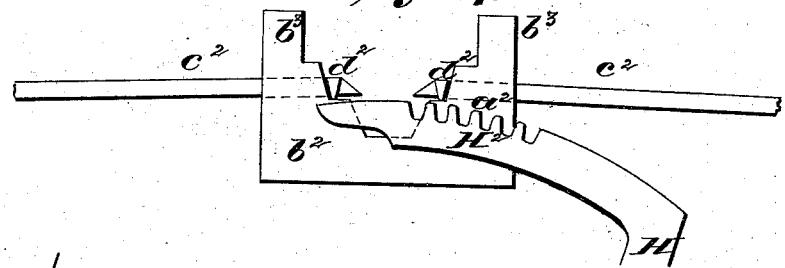

The operation of this brake-setting mechanism will be understood to be as follows: Suppose the brake to be in an inactive position—i. e., so adjusted by the centering-spring of the arm H that the brakes are in a state of inactivity, as seen, for instance, at Figs. 3 and 13—and suppose the car to be moving in the direction indicated by the arrow in Fig. 13. Now, if the engine be suddenly slacked up, (or reversed,) so that the buffer at the right-hand side of Fig. 13 be pressed in, this movement of the buffer-bar will push the forward rod $c^2$ in the direction indicated by the arrow on said rod and into the position shown at Fig. 15, and in making this movement said rod will have had its stud $d^2$ permitted to descend into engagement with the teeth of sector $a^2$, and will have (during such engagement) moved said sector on its axis of motion, thus rocking shaft F and throwing the brakes into an operative condition, the stud $d^2$ of said rod having passed out of engagement with said sector during the latter part of the said movement of said rod. In changing its position from that seen at Fig. 13 to that seen at Fig. 15, the rod $c^2$ will have passed beneath the free end of the other brake-rod and lifted it into the position seen at Fig. 15, so that any subsequent endwise movement of such other rod into the position shown, for instance, at Fig. 16 may occur without producing any effect on the sector $a^2$; and when the assumed direction of movement of the car ceases or is changed the brakes release themselves, there being now no impediment to a resumption of its normal position by the sector $a^2$, and at the same time, the spring-buffers resuming their former positions, the brake-rods return to their original positions, as seen at Fig. 14. Now if, with all the parts in their normal or inactive positions, the train be backed, the brake-rods will of course be moved in the same manner and to the same positions relatively to each other and to the sector $a^2$ as just explained in the case of the retardation of the train, and the same movement of or effect on the sector $a^2$ will therefore be reproduced by the stud $d^2$ of brake-rod $c^2$; but as the wheels of the car will now be rotating in an opposite direction there will be a refusal of the brake-shoes to coact with the wheels, said shoes will be thrown away from, in lieu of being drawn into frictional engagement with, the peripheries of the wheels, and the sector $a^2$ will immediately after its disengagement from the stud $d^2$ of rod $c^2$ resume its position of inactivity, and be left free for any subsequent action that may be required of it, while the brake-rods will be forced to remain as they are, and all the parts will be in the positions seen at Fig. 16. Now, the moment the engine slacks up (on the backing train) the first effect is the separation of the cars and the consequent pulling out of the buffer-bars, which causes the brake-bars to be drawn back to the positions seen at Fig. 14; but in thus resuming their normal or original positions, though the upper one of the two brake-bars goes back to the position seen at Fig. 14 without affecting the sector $a^2$, the lowermost rod $c^2$, in going back, has its stud $d^2$ thrown into engagement with the said sector and moving it, as seen at Fig. 17, in a direction opposite to that in which it moved it when the train began to back effects, through such movement of said sector, the adjustment of the brakes to that relation with the wheels which enables the latter to take the necessary hold on them and draw them into the necessary frictional contact to neutralize the rotation of said wheels and stop the backing train, after which stoppage of the train the parts, as usual, all resume their first-described relative positions.

From the foregoing explanations it will be seen that to whichever end of the train the engine may be attached, and that whether the engine be pushing or pulling the train, the described automatic brake mechanism will be equally operative in its described functions, and for the purposes of checking either a forward or backward motion of such train.

In lieu of having the brake mechanism proper adapted to work as shown and described, the construction and arrangement of the parts might be such (as shown at Fig. 18) that the action of the brake-shoes, in applying them to the wheels, would tend to force the car-wheel axles toward each other instead of away from each other; and it will, of course, be understood that many modifications of the principles of construction and many changes of details in the contrivance shown may be made without departing from the gist of the main features of my invention.

Having now sufficiently explained the nature and operation of my invention to enable any skilled engineer or constructer of railway-carriages to understand and practice it, what I claim as new, and desire to secure by Letters Patent, is—

1. The combination, with the wheel of a car or carriage, of a brake-shoe mounted on a frame or supporting device adapted to vibrate about a fixed axis of motion, and acting with an elastic or yielding force, the combination being such that the braking power is derived solely from the rotative action of the wheel, substantially as hereinbefore set forth.

2. In combination with the brake device of a car-brake mechanism in which the brake-power is derived from the rotative action of the wheel, a device or means for limiting or regulating the extent of movement of the brake-shoe, to prevent the parts of the mechanism from assuming any relative position that might interfere with a ready releasement of the brake.

3. The combination, with the brake-shoe, wheel, and brake-supporting devices of a car-brake mechanism in which the brake-power is derived from the rotative action of the wheel, of a spring-like or slightly-elastic abutment or support to the brake, substantially as and for the purpose set forth.

4. In a car-brake mechanism in which the brake-power is derived solely from the rotative action of the wheels, the combination, with a pair of wheels on the same side of a car, of a brake device or mechanism mounted to oscillate about a fixed axis of motion, and adapted to apply a yielding pressure to the wheels, the combination being such that the simultaneous thrusts upon the brake devices operate practically to substantially relieve its pivotal support or device from material strain.

5. In a car-brake mechanism in which the brake-shoe is drawn into operation to brake the car by the rotative action on it of the wheel, a brake-shoe adapted to be supported upon either of two fulcral points, in combination with a shoe-supporting frame provided with two pintles or pivotal supports, as set forth.

6. The combination, with a brake mechanism in which the brake-pressure is induced by the rotative action of the wheel on the brake-shoe, of a mechanism for moving the brake-shoe up to and away from the wheel's periphery with positive movements, substantially as hereinbefore set forth.

7. In combination with the buffer-bars of the car and a brake mechanism proper which receives its brake-power solely through the rotative action of the car-wheel on the brake-shoe, a mechanism constructed and operating, as set forth, to work automatically for the purposes of both setting and permitting the releasement of the brakes.

Witness my hand this 22d day of April, 1880.

WILLIAM D. EWART. [L. S.]

In presence of—
JACOB FELBEL,
M. E. JANVIER.